(12) United States Patent
Rolland

(10) Patent No.: US 12,325,969 B2
(45) Date of Patent: Jun. 10, 2025

(54) MODULAR CONCRETE FOUNDATION

(71) Applicant: STATIONS-E, Boussy-Saint-Antoine (FR)

(72) Inventor: Alain Rolland, Quincy sous Senart (FR)

(73) Assignee: STATIONS-E, Boussy-Saint-Antoine (FR)

( * ) Notice: Subject to any disclaimer, the term of this patent is extended or adjusted under 35 U.S.C. 154(b) by 65 days.

(21) Appl. No.: 17/851,186

(22) Filed: Jun. 28, 2022

(65) Prior Publication Data

US 2023/0022855 A1 Jan. 26, 2023

(30) Foreign Application Priority Data

Jun. 28, 2021 (FR) ...................................... 2106915

(51) Int. Cl.
*E02D 27/42* (2006.01)
*E02D 27/01* (2006.01)
*E02D 5/10* (2006.01)

(52) U.S. Cl.
CPC ........... *E02D 27/016* (2013.01); *E02D 27/42* (2013.01); *E02D 5/10* (2013.01)

(58) Field of Classification Search
CPC ....... E02D 27/01; E02D 27/016; E02D 27/42; E02D 29/025
USPC .................................................. 52/606, 607
See application file for complete search history.

(56) References Cited

U.S. PATENT DOCUMENTS

| 836,017 | A | * | 11/1906 | Douglass | .................. | E04B 2/14 |
| | | | | | | 52/505 |
| 1,524,146 | A | * | 1/1925 | Murray | ..................... | E04B 2/14 |
| | | | | | | 52/302.4 |
| 4,567,690 | A | | 2/1986 | Murrell | | |
| 5,048,250 | A | * | 9/1991 | Elias | ........................ | E04B 2/54 |
| | | | | | | 52/437 |
| 6,397,549 | B1 | * | 6/2002 | Baldwin | .................. | E04C 1/40 |
| | | | | | | 52/607 |

(Continued)

FOREIGN PATENT DOCUMENTS

| AU | 2019250646 A1 | * | 12/2020 | ......... E04H 12/2238 |
| CN | 210460137 U | | 5/2020 | |
| IT | PR 990082 A1 | | 5/2001 | |

(Continued)

OTHER PUBLICATIONS

French Search Report (FSR) for FR 2106915 completed Mar. 30, 2022 (8 pages).

*Primary Examiner* — Frederick L Lagman

(74) *Attorney, Agent, or Firm* — Shumaker, Loop & Kendrick, LLP

(57) ABSTRACT

A modular foundation including plurality of prefabricated concrete modules defining an upper layer of modules including at least one internal passage opening onto at least its upper and lower faces, at least one lower layer of modules on which the upper layer at least partially rests, including at least one internal passage opening onto at least one of its sides and onto at least its upper face, this internal passage communicating at the level of the interface between the upper layer and the lower layer(s) with the internal passage of the upper layer in such a manner as to form at least one global internal passage in the foundation opening onto at least one side and onto at least the upper face of the foundation.

23 Claims, 18 Drawing Sheets

(56) References Cited

U.S. PATENT DOCUMENTS

| | | | |
|---|---|---|---|
| 7,191,571 B2* | 3/2007 | Schools | ............... E04B 2/26 52/505 |
| 2013/0333313 A1* | 12/2013 | Alsayed | ............ E04C 1/397 52/607 |

FOREIGN PATENT DOCUMENTS

| | | | |
|---|---|---|---|
| KR | 200439763 Y1 * | 5/2008 | |
| KR | 101132200 B1 * | 4/2012 | |
| KR | 20120063869 A * | 6/2012 | |
| KR | 20200039381 A | 4/2020 | |
| WO | 2011034603 A2 | 3/2011 | |
| WO | 2016/011735 A1 | 1/2016 | |

\* cited by examiner

MODULAR CONCRETE FOUNDATION

TECHNICAL FIELD

The present invention concerns modular foundation systems, in particular those including concrete modules.

PRIOR ART

The antennas of telecommunication networks are generally supported by masts connected to a concrete foundation that may or may not be buried.

The dimensions and properties of the foundation are constrained by the characteristics of the mast, its exposure to atmospheric conditions and the conditions necessary for correct functioning of equipment installed on the mast.

For example, a mast receiving radio-antenna type telecommunication equipment has a relatively tight maximum depointing limit, of the order of 1°, which leads to constraints both as regards the mast and as regards the foundation to which the forces are transferred, either locally at the foot of the mast if the latter is directly fixed to the foundation or distributed over the foundation if the mast is supported by an infrastructure fixed to the foundation.

The foundations supporting mast or antenna-type structures generally include a monolithic block of concrete that is poured directly on the installation site. This method necessitates transporting both construction materials and assembly materials to the site, as well as the labour necessary to accomplish this task, which can take a long time and prove costly.

The application WO2011034603 discloses a modular foundation system for supporting antennas, masts or technical equipment, the foundation including prefabricated concrete blocks assembled together by means of post-stressing cables extending in different horizontal directions.

The application CN201920873904U discloses a modular foundation system for a telecommunication mast including central prefabricated concrete modules to which are assembled adjacent modules serving as counterweights.

STATEMENT OF INVENTION

There exists a need for further improvement of modular concrete foundations in order to have available a system that is easy to transport, to assemble and/or to dismantle on site relatively rapidly and able to support infrastructures subjected to relatively high forces, in particular infrastructures including a mast.

There is also still a benefit in a modular foundation facilitating the arrival in the supported structure of cables, in particular electrical cables.

SUMMARY OF THE INVENTION

The invention aims to address that objective and in one of its aspects has for object a modular foundation including:
A plurality of prefabricated concrete modules defining:
an upper layer of modules including at least one internal passage opening onto at least its upper and lower faces,
at least one lower layer of modules on which the upper layer at least partially rests, including at least one internal passage opening onto at least one of its sides and onto at least its upper face, this internal passage communicating at the level of the interface between the upper and lower layers with the internal passage of the upper layer in such a manner as to form at least one global internal passage in the foundation opening onto at least one side and onto at least the upper face of the foundation.

A foundation of this kind can easily be installed on site and the pre-existing internal passage or passages facilitate(s) the connection of electrical cables and other networks.

The global internal passage preferably opens onto at least two sides and onto at least the upper face of the foundation or, better still, onto all the sides and onto the upper face. Thus the connection to underground networks can be effected regardless of their direction.

The global internal passage may have a section having a diameter at least equal to 80 mm, which enables insertion therein of protective ducts with a view to passing cables into it.

The global internal passage preferably therefore includes at least one duct enabling the passage of cables, in particular electrical cables or optical fibres, toward the infrastructure supported by the foundation.

These cables are for example connected to electrical equipment received within this infrastructure.

The plurality of modules preferably forms a whole of substantially parallelepipedal general shape, having for example a height between 50 and 80 cm inclusive.

The foundation may include a stack of at least three layers of modules, each layer including an internal passage communicating with the internal passage of a layer that is adjacent to it. The number of layers may be chosen as a function of the required mass of the foundation.

Arrangement of the Modules in the Foundation

The modules of the same layer are preferably assembled together laterally. The modules may be disposed with an offset from one layer to the next, in particular in a quincunx arrangement from one layer to the next.

The modules in a layer may be entirely or partly identical.

At least one layer of modules of the foundation preferably includes at least two modules with different lengths, preferably at least two modules one of which has a length substantially twice that of the other. When the modules are disposed in a quincunx arrangement, this enables layers to be formed that all have the same length and therefore stack exactly.

Apart from the global internal passage, the foundation may include vertical reservations on at least two modules that are at least partially stacked, the vertical reservations communicating at the level of the interface between the two modules.

These vertical reservations are preferably arranged to receive tie-rods for assembling the modules together and/or bolts engaging in threaded inserts.

These reservations may enable the modules and/or the layers of the foundation to be fixed in them, in particular by means of anchor bushes placed in the layer from below and in which the bolts and/or the tie-rods come to be inserted.

Modules

The modules are preferably of parallelepipedal general shape. They have for example a mass between 400 and 900 kg inclusive and a thickness between 200 and 300 mm inclusive.

The modules of the foundation assembly preferably have the same width, for example between 90 and 110 cm inclusive.

The modules may have first reliefs on their lower face, the modules of the lower layer or layers having second reliefs on their upper face, the second reliefs being arranged to nest at least partially in the first reliefs.

At least some of the modules preferably include a vertical cavity on at least two opposite sides, in particular a cavity of semi-cylindrical shape, adapted to form with an opposite vertical cavity of an adjacent module a vertical internal passage of greater section, in particular of circular section. This vertical cavity preferably communicates with the global internal passage of the foundation when the modules are assembled.

Modules of the Upper Layer

The modules of the upper layer preferably include at least one internal passage opening onto at least their upper and lower faces, in particular an internal passage formed by the combination of a horizontal reservation and at least one vertical reservation, preferably a vertical reservation placed at the centre of the module, preferably at least three vertical reservations including one placed at the centre of the module.

Modules of the Lower Layers

Similarly, the modules of the lower layer or layers include at least one internal passage opening onto at least one of their sides and onto at least their upper face, preferably onto at least two opposite sides and on to the upper and lower faces of the module, in particular an internal passage formed by the combination of a horizontal reservation and at least one vertical reservation.

The internal passages of the modules of the upper and lower layers preferably form a part of the global internal passage of the foundation.

The modules of the lower layer or layers may also include at least one horizontal cavity on at least two opposite sides, in particular a cavity of semi-cylindrical shape, arranged to form with an opposite horizontal cavity of an adjacent module a horizontal internal passage of greater section, in particular of circular section.

Support Slabs and Layer

The modular foundation according to the invention may include a support layer including concrete slabs on which all the modules rest.

In some embodiments at least one of said slabs is wider than the rest of the modules, which enables the seating of the foundation to be increased. In other embodiments the slabs are the same width as the rest of the modules.

The support layer has for example a thickness between 200 and 300 mm inclusive.

The concrete slabs preferably include housings on their upper face in which the modules of the layer resting on the support layer can come to nest, in particular via the aforementioned reliefs.

The concrete slabs may include vertical reservations opening onto their upper face.

The latter may serve for fixing the modules of the layer resting on the support layer, for example thanks to anchor bushes as described above.

The foundation may include reservations, preferably at least four reservations, passing vertically through the upper layer and at least partially through the lower layer or layers.

If the foundation does not include a support layer these vertical reservations terminate for example at a plate bush placed in the lower layer that is in contact with the ground, which enables the infrastructure supported by the foundation to be fixed, in particular by means of assembly tie-rods coming to be fixed into the plate bushes.

Alternatively, these reservations may communicate with vertical reservations in the concrete slabs at the level of the interface between the support layer and the layer resting on the support layer, a plate bush then being able to be placed in the concrete slabs.

Installation Method

The invention also has for object a method of installing a modular concrete foundation as defined above, the method including the steps consisting in:

producing an excavation, producing the foundation by placing prefabricated concrete modules in the excavation.

The method may include the insertion of cable passage ducts in the internal passages of the foundation thus constituted.

The method may also include fixing the modules together by means of tie-rods passing through the modules.

BRIEF DESCRIPTION OF THE DRAWINGS

The invention will be better understood after reading the following detailed description of non-limiting embodiments thereof and examining the appended drawings, in which.

DETAILED DESCRIPTION

Figure 1:
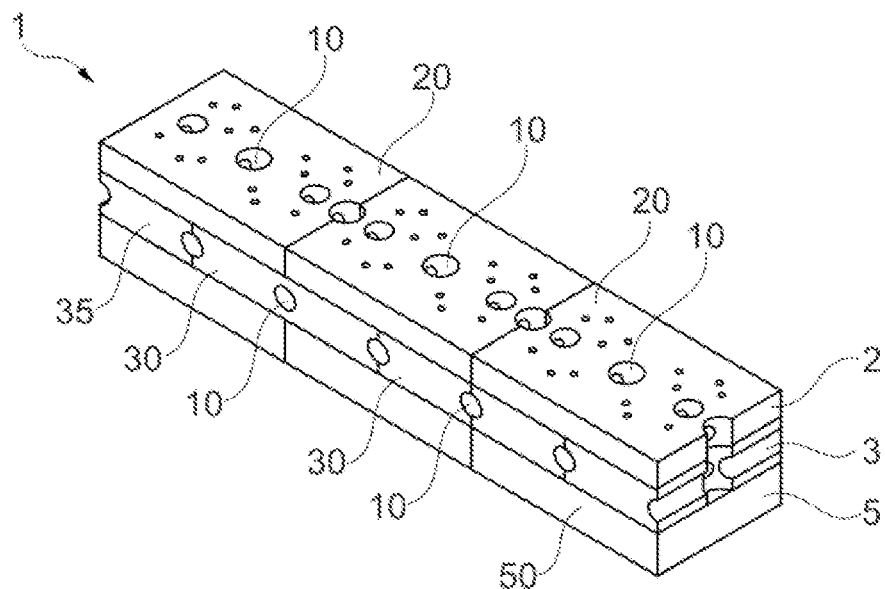
FIG. 1 represents schematically an example of a foundation according to the invention.

There has been represented in FIG. 1 an example of a modular foundation 1 according to the invention. The modular foundation 1 has the shape of a slab and includes an upper layer 2 resting on a lower layer 3 and an underlying support layer 5.

A continuous internal passage 10 extends horizontally and vertically in the upper layer 2 and the lower layer 3 and opens onto the upper face of the foundation 1 and onto all its sides.

This internal passage for example enables cables to be passed toward the interior of the structure supported by the foundation 1, in particular when the latter receives electrical equipment.

The upper layer 2 includes three identical modules 20 of parallelepipedal shape each referred to hereinafter as an "upper module".

The lower layer 3 includes four parallelepipedal modules assembled laterally together, each being referred to hereinafter as a "lower module"; thus the layer 3 includes two first modules 30 onto which are assembled, on either side, two identical modules 35 that are identical to half of the first modules 30.

All the modules have the same width 1, for example approximately 100 cm.

The upper modules 20 and the lower modules 30 have the same length L, for example approximately 150 cm, and are disposed in a quincunx arrangement from one layer to another. The two modules 35 assembled at the ends of the lower layer 3 have a length substantially equal to half the length L/2 of the other modules, so that the layers 2 and 3 stack exactly.

The upper layer 2 has for example a thickness of approximately 200 mm.

The upper layer 3 has for example a thickness of approximately 300 mm.

In the example considered here the support layer 5 includes three concrete slabs 50 referred to hereinafter as the "support slabs".

The slabs 50 are parallelepipedal, with a length and a width equal to those of the upper modules 20, and for example are approximately 300 mm thick.

Figure 2A:
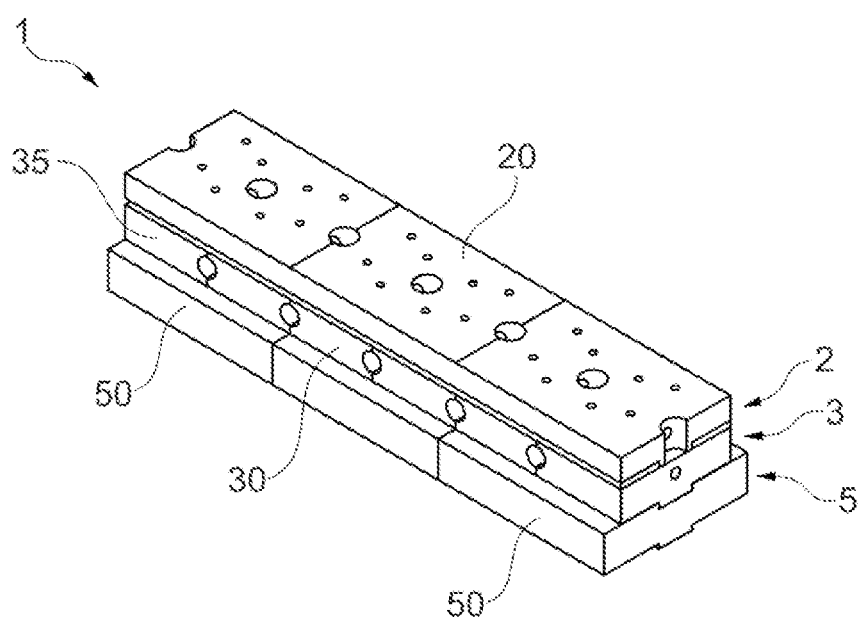
FIG. 2a, FIG. 2b, FIG. 2c and FIG. 2d illustrate schematically other examples of foundations according to the invention.

In the example illustrated in FIG. 2a, the support slabs 50 are wider than the rest of the modules, which enables the foundation to support higher stresses.

The size of the foundation 1 and the number of lower layers 3 varies and may be chosen as required. The foundation may include the support layer 5 or not, this choice depending in particular on climatic conditions and the nature of the soil on the site on which the foundation is installed.

Figure 2B:
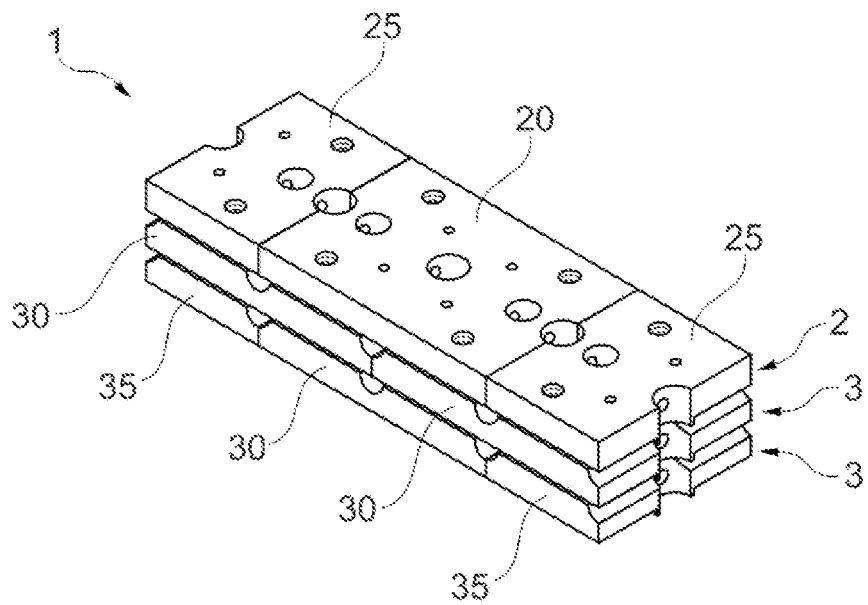

In the example illustrated in FIG. 2b, the foundation 1 includes two lower layers 3 on which rests an upper layer 2 including an upper module 20 and two upper half-modules 25 assembled on respective opposite sides of the module 20.

The global internal passage 10 is formed by an internal passage 12 of the upper layer and internal passages 13 of the lower layers that communicate at the interface between two adjacent layers.

The global internal passage 10 opens onto each of the lateral faces of the layers 2 and 3, that is to say on three levels of the foundation 1, and onto each of the front and rear faces (not visible in FIG. 2b) of the lower layers 3 at a number of locations regularly spaced in the lengthwise direction.

The internal passage 10 also opens at a number of locations onto the upper face 2a of the upper layer.

Figure 2C:
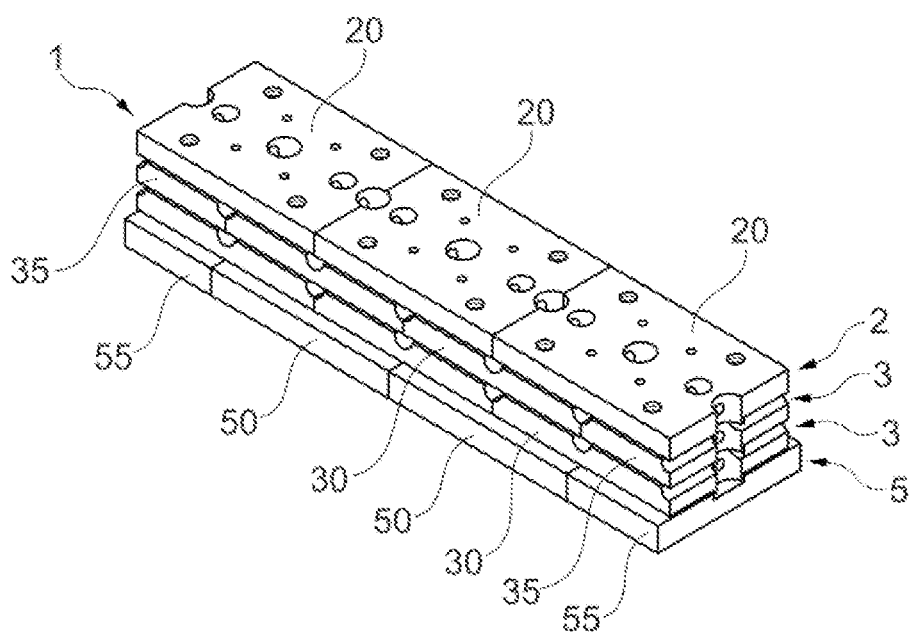

In the example illustrated in FIG. 2c the foundation includes four layers in total: an upper layer 2, two lower layers 3 and a support layer 5.

The upper layer 2 and the lower layers 3 have the same thickness, for example equal to approximately 200 mm.

In this example, the slabs 50 of the support layer 5 have two different lengths, one being twice the other, in order for the total length of the support layer 5 to be the same as that of the other layers 2 and 3.

The support layer 5 is for example thicker than the other layers and is for example approximately 300 mm thick.

Figure 2D:
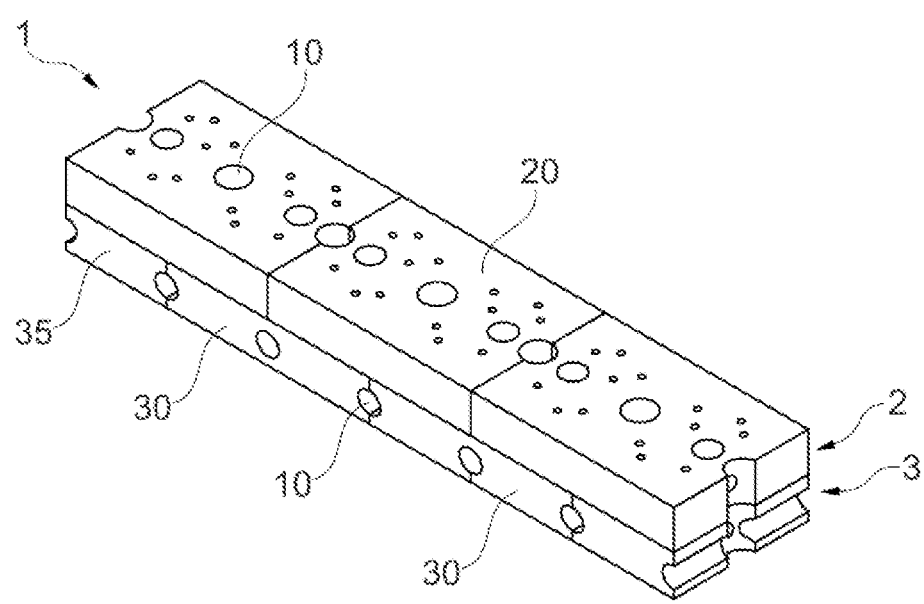

When the soil conditions of the installation site allow it, the foundation need not include the support layer 5, and in particular may include an upper layer 2 and only one lower layer 3, as illustrated in FIG. 2d.

In this case the lower layer 3 preferably includes means for fixing the supported infrastructure, as will be described below.

Figure 3:
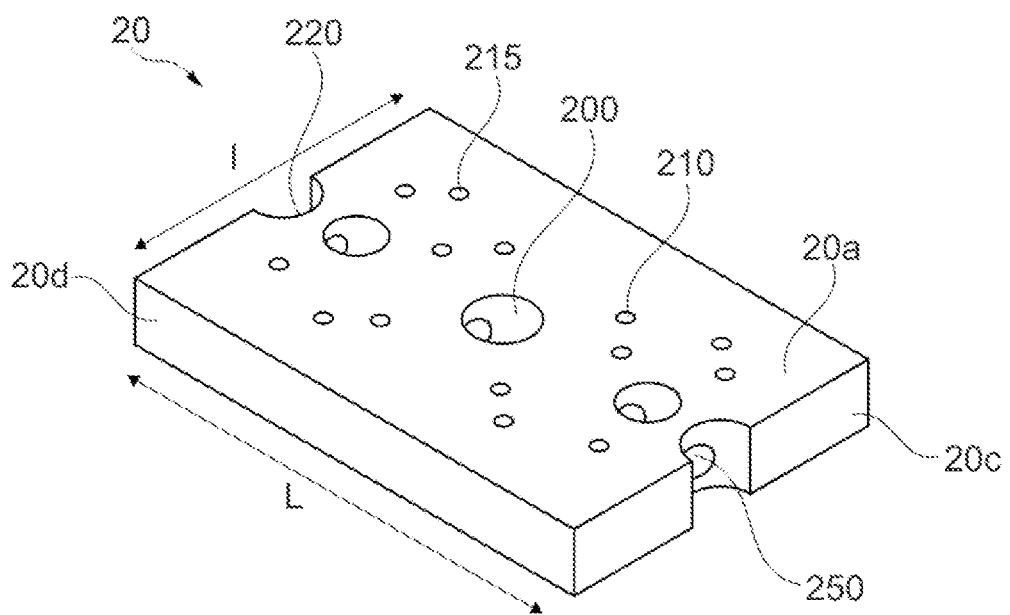
FIG. 3 is a schematic partial perspective view of an example of an upper module.

Examples of modules will now be described with reference to FIG. 3 (upper module 20), FIG. 6a (lower module 30) and FIG. 9 (support slab).

Figure 11:
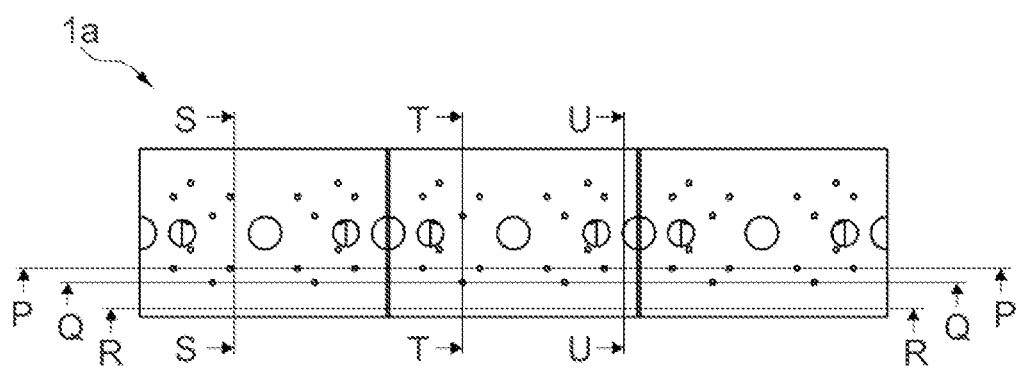
FIG. 11 represents schematically and partially the upper face of a foundation according to the invention.
Figure 12A:
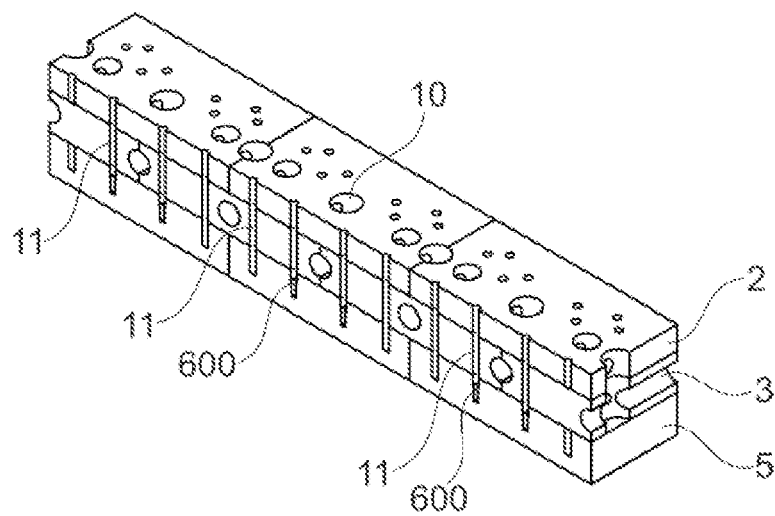
FIG. 12a, FIG. 12b, and FIG. 12c illustrate the foundation from FIG. 1 in longitudinal schematic and partial section taken along the lines P, Q and R in FIG. 11, respectively.

The assembly and fixing together of the various elements of the foundation and the fixing of the structure supported by the foundation will be described hereinafter with reference to FIGS. 11 to 13.

Figure 4A:
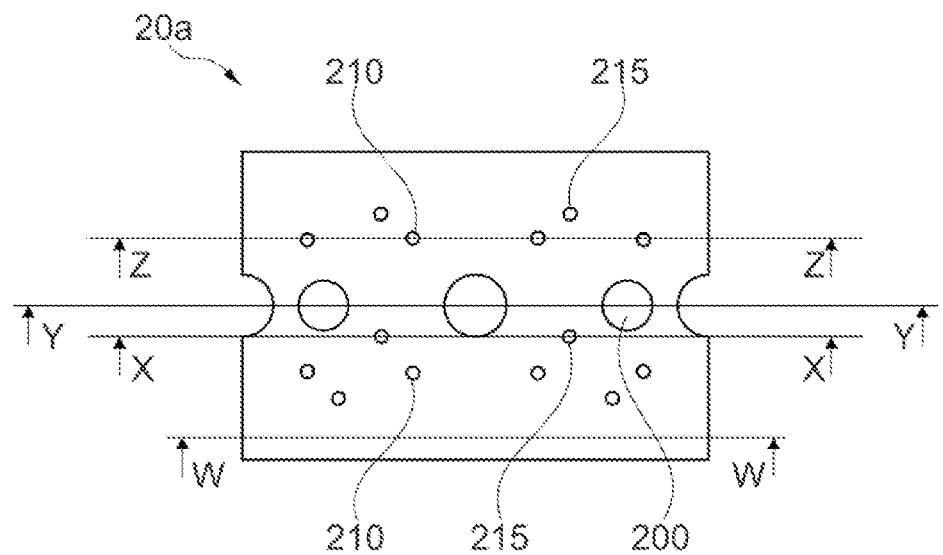
FIG. 4a and FIG. 4b represent the upper and lower faces of the upper module from FIG. 3, respectively.
Figure 5A:
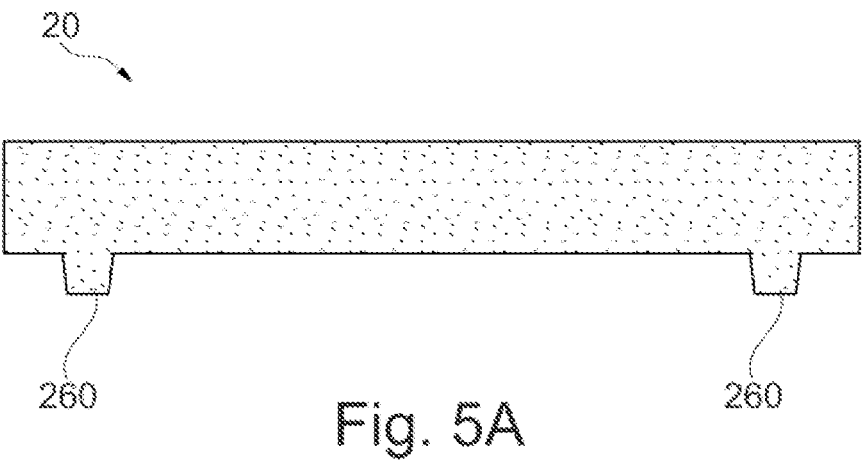
FIG. 5a, FIG. 5b, FIG. 5c and FIG. 5d illustrate in schematic partial longitudinal section taken along the lines W, X, Y and Z in FIG. 4a, respectively, some structural elements of the module from FIG. 3, FIG. 6a and FIG. 6b represent a schematic partial perspective view of examples of lower modules.
Figure 5B:
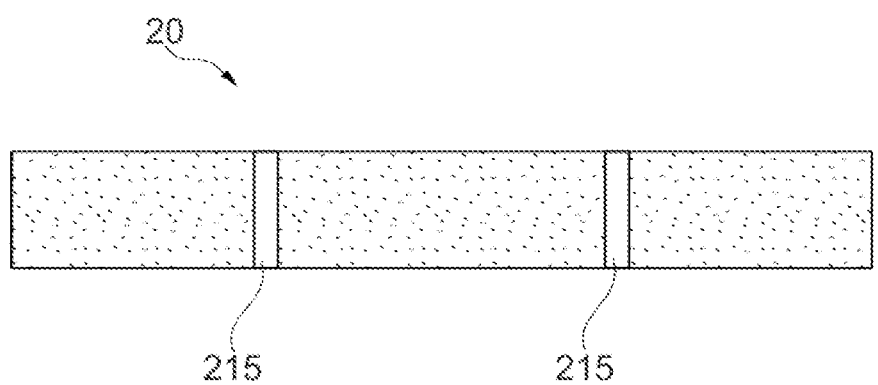
Figure 5C:
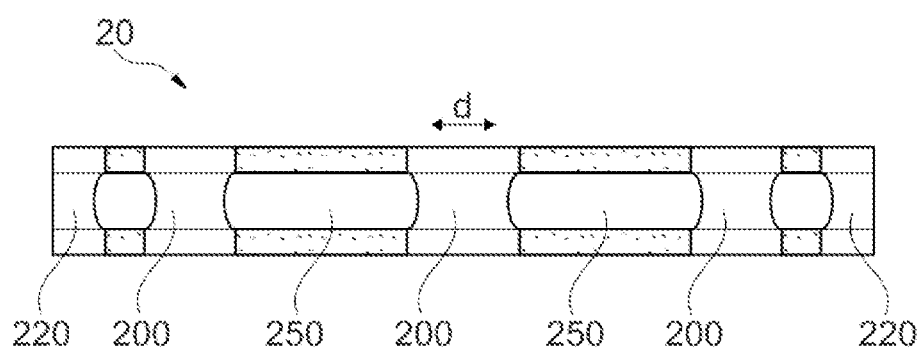

The upper module 20 includes for example three vertical reservations 200 passing through it the axes of which are disposed in the median longitudinal plane of the module, as illustrated in FIG. 4a, and a horizontal reservation 250 passing through it that communicates with the vertical reservations 200, as illustrated in FIG. 5c.

The reservations 200 have for example a diameter d between 80 and 220 mm inclusive. They are able to receive protection ducts serving for example for the passage of electrical cables or optical fibres toward the interior of the structure supported by the foundation, where they may be connected to the electrical equipment of the structure.

The module 20 may also include a vertical cavity 220 of semi-cylindrical shape on its two lateral faces 20c which communicates with the horizontal reservation 250.

Thus when the modules 20 are assembled together to form the upper layer 2 the vertical cavity 220 forms with the opposite cavity 220 of an adjacent module 20 a vertical reservation of circular section similar to the reservations 200.

The upper module 20 preferably includes bosses 260 on its lower face enabling nesting of the upper layer 2 in the lower layer 3. These reliefs 260 have a frustoconical shape for example, as illustrated in FIG. 5a, with a diameter of the order of 100 mm and a height of approximately 80 mm.

Figure 4B:
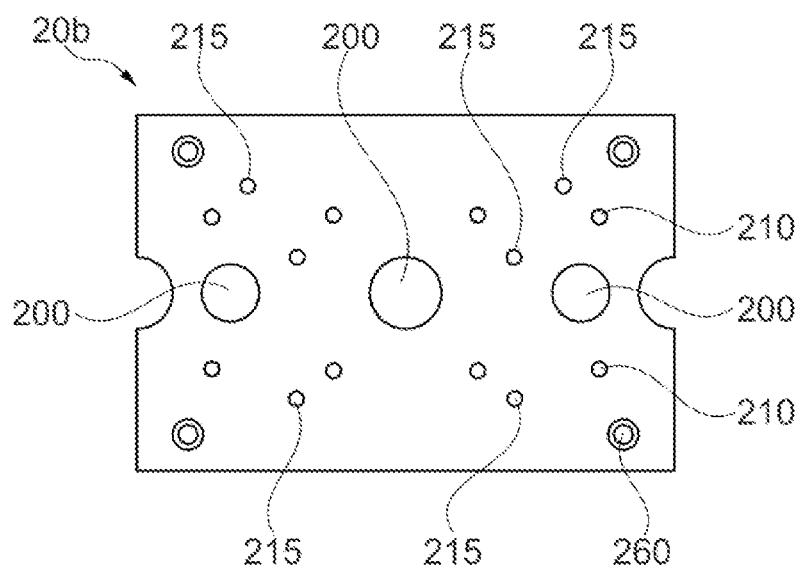

The reliefs 260 are for example disposed at the four corners of the module, as illustrated in FIG. 4b.

Figure 5D:
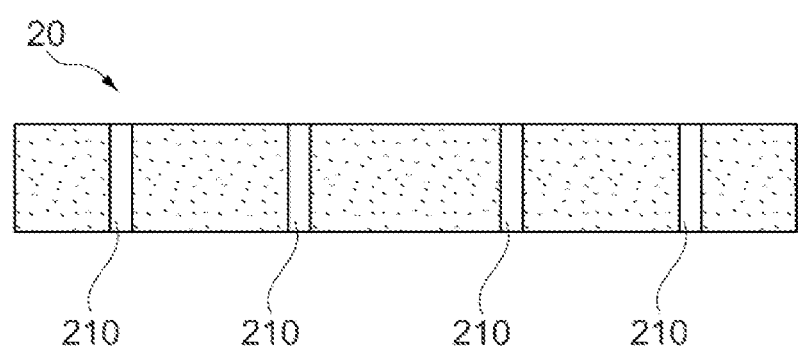

The upper module 20 includes other vertical reservations 210 and 215. These are through-reservations and open onto its lower and upper faces, as illustrated in FIGS. 5b and 5d. They have a smaller diameter than the reservations 200, for example between 35 and 40 mm.

The reservations 210, of which there are eight for example in the example under consideration, may receive means for fixing the structure supported by the foundation, in particular when the latter includes a mast.

The reservations 215, of which there are six for example in the example under consideration, may receive fixing means between the upper module 2 and the lower layer 3 on which it rests, as described below.

Figure 6A:
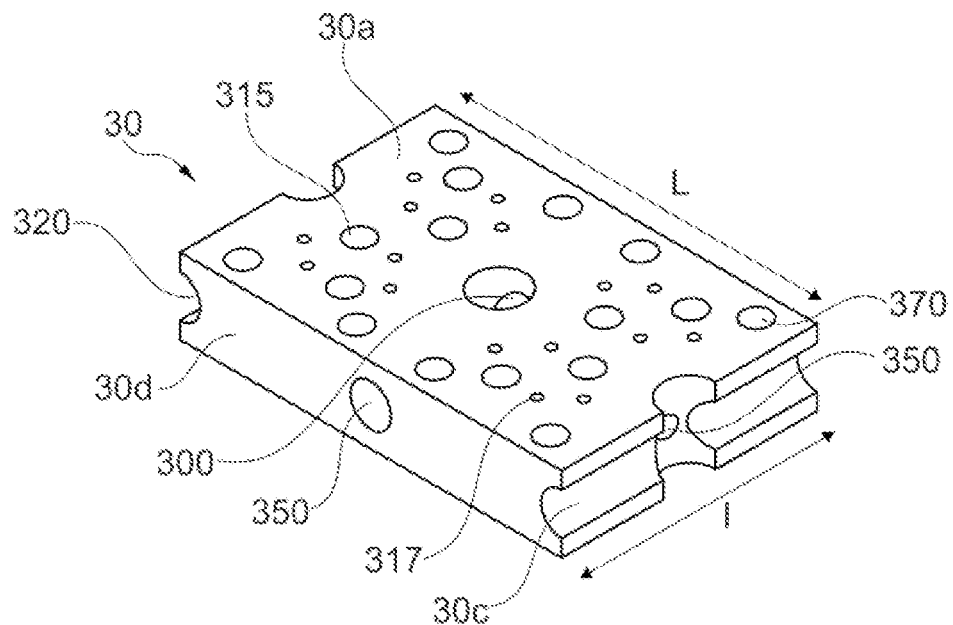

The lower module 30 includes for example a vertical reservation 300 passing through it and two horizontal reservations 350 passing through it, disposed for example perpendicularly so as to open onto all the sides 30c and 30d of the module 30, as represented in FIG. 6a.

Figure 8A:
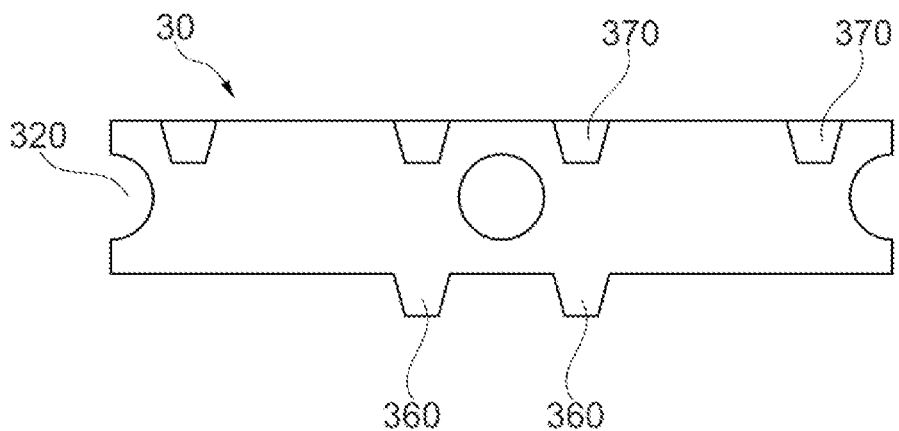
FIG. 8a, FIG. 8b, FIG. 8c and FIG. 8d illustrate in schematic longitudinal section taken along the lines AF, AG, AK and AH in FIG. 7a, respectively, some structural elements of the module from FIG. 6a, FIG. 9 is a schematic partial perspective view of an example of a slab of a support layer.
Figure 8B:
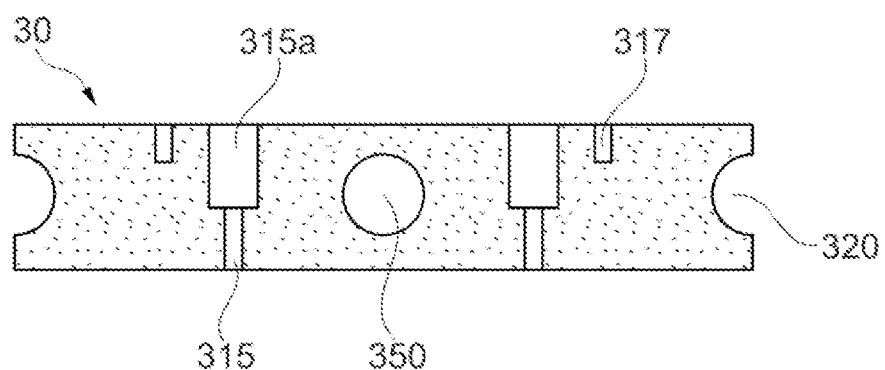
Figure 8C:
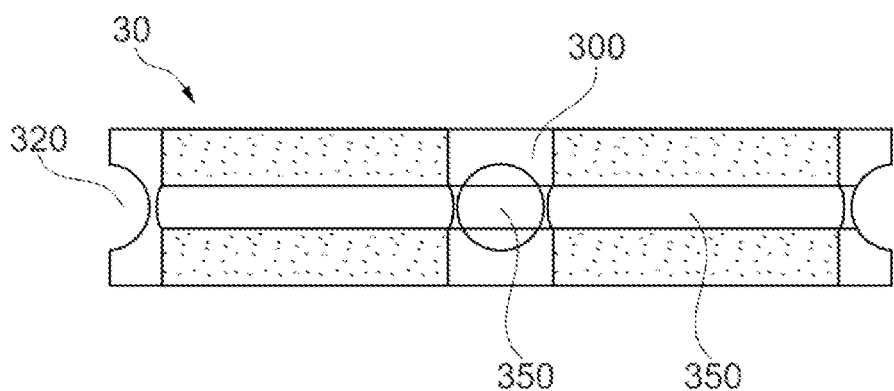

As illustrated in FIG. 8c, the reservations 300 and 350 communicate with one another, for example at the centre of the module.

The vertical reservations 300 communicate at the level of the upper face 30a of the module 30 with those of the upper layer 2 so as to form the aforementioned internal passage 10.

The module 30 may also include a horizontal cavity 320 of semi-cylindrical shape on its two lateral faces 30c, communicating with the horizontal reservation 350 that extends longitudinally.

The cavity 320 forms a cylindrical horizontal reservation with that of a lower module 30 or 35 assembled to it laterally.

Figure 7A:
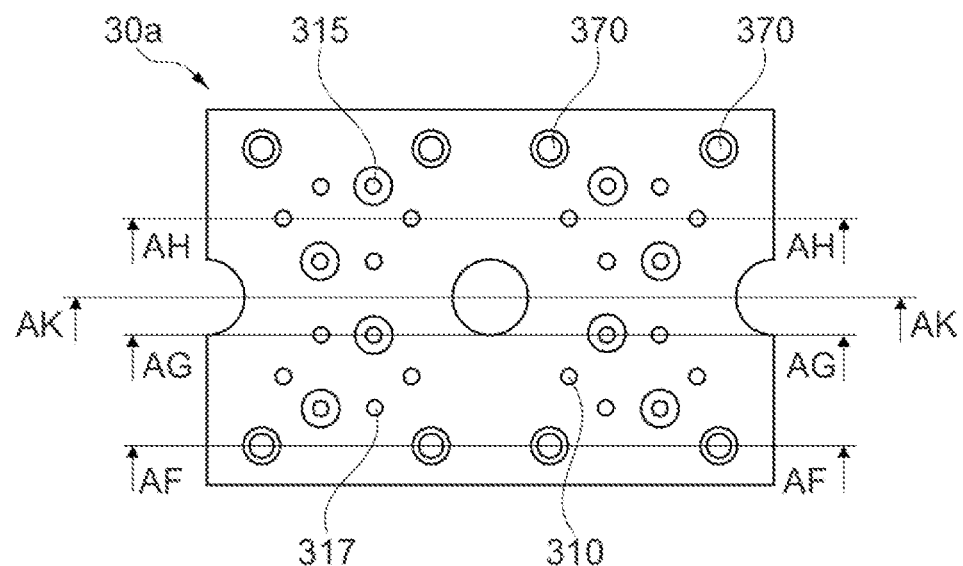
FIG. 7a and FIG. 7b represent the upper and lower faces of the upper module from FIG. 6a, respectively.
Figure 7B:
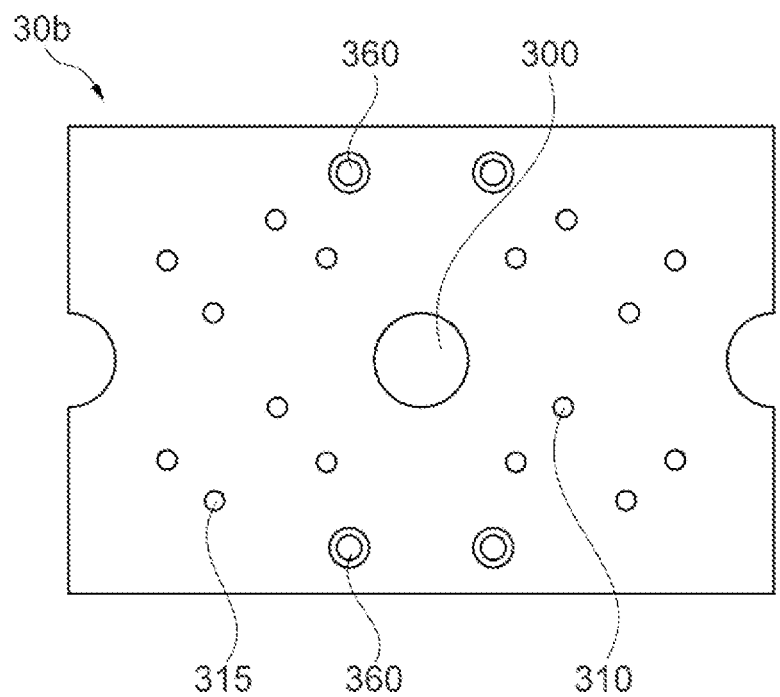

In the example under consideration and as represented in FIG. 7b the lower module 30 includes on its lower face 30b bosses 360 intended to nest in corresponding housings disposed on the upper face of the modules on which the lower module 30 can rest.

This means for example other lower modules 30 if the foundation includes a plurality of lower layers 30 which include for example eight housings 370 as illustrated in FIG. 7a.

The housings 370 are for example disposed in rows of four along longitudinal edges of the upper face 30a of the module 30, the housings of one row being apparent in FIG. 8a, in such a manner as to be able to receive the bosses 260 of the upper modules 20 and/or the bosses 360 of the upper modules 30.

Figure 10A:
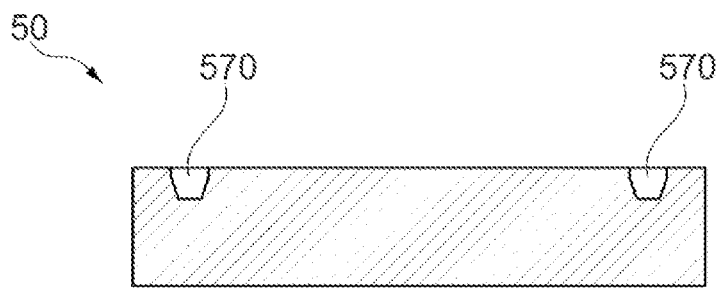
FIG. 10a, FIG. 10b, FIG. 10c and FIG. 10d illustrate in schematic partial longitudinal section taken along the lines AL, AM, AN and AQ in FIG. 9, respectively, some structural elements of the slab from FIG. 9.

The support slabs 50 may also include rows of housings 570, as illustrated in FIG. 10a.

The lower module 30 includes other vertical reservations 310 that have a small diameter, for example of the order of 40 mm. These reservations 310 are arranged to communicate with the reservations 210 of the upper modules 20 in order to fix the structure supported by the foundation.

Figure 8D:
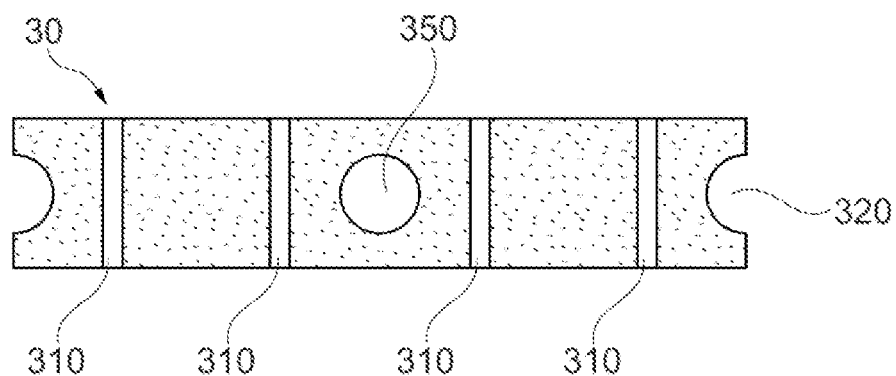

The reservations 310 may be through-reservations, as illustrated in FIG. 8d, in particular in order to communicate with certain reservations of the support slabs when the foundation includes a support layer 5.

The reservations 310 may also not be through-reservations, in particular when the foundation includes only two layers, namely an upper layer 2 and a lower layer 3.

Figure 14:
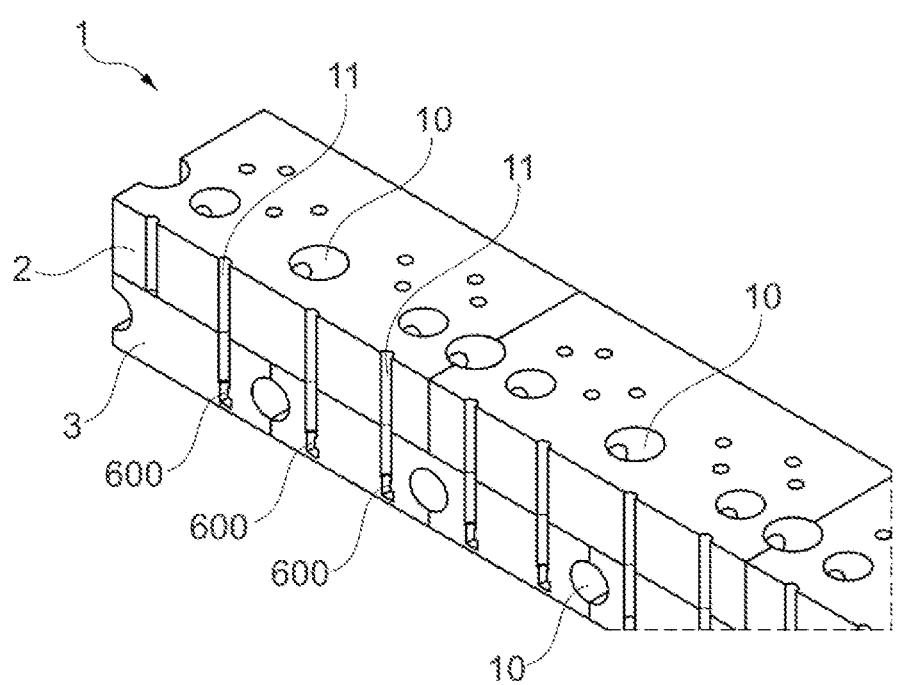
FIG. 14 illustrates in schematic and partial longitudinal section taken along the line P in FIG. 11 a foundation including two layers.

In this case, the reservations may take the form of housings at the bottom of which are for example placed plate bushes 600 when pouring the modules 30, as illustrated in FIG. 14. In the example under consideration, the lower module 30 additionally includes vertical reservations 315 used for fixing the module to the layer on which it rests, for example another lower layer or the support layer.

As illustrated in FIG. 8b, the vertical reservations 315 are through-reservations and include an enlargement 315a in their upper part that makes it possible to receive the head of a fixing bolt when placing and fixing the module on and onto the underlying layer.

The lower module 30 may include, in the same plane as the reservations 315, housings 317 adapted to align with the reservations 215 (respectively 315) of the upper module 20 (respectively lower module 30) resting on this module 30 in the foundation 1.

Figure 12B:
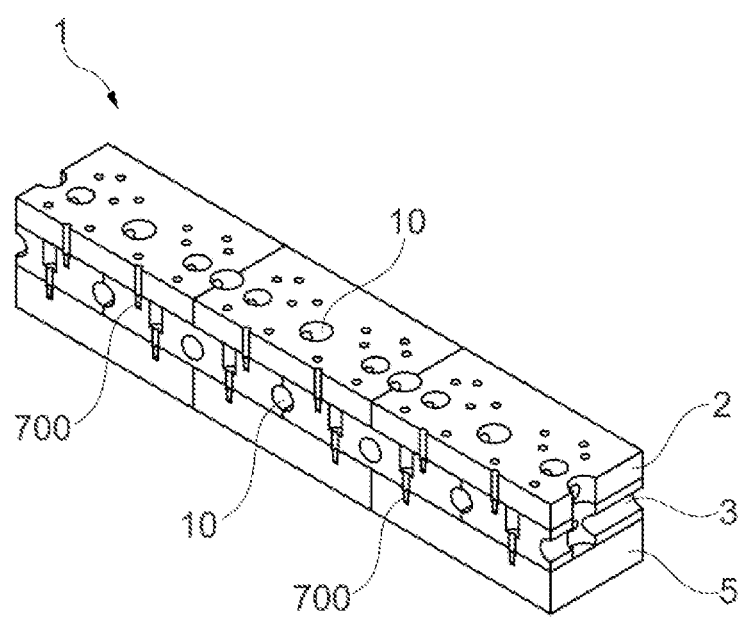
Figure 13A:
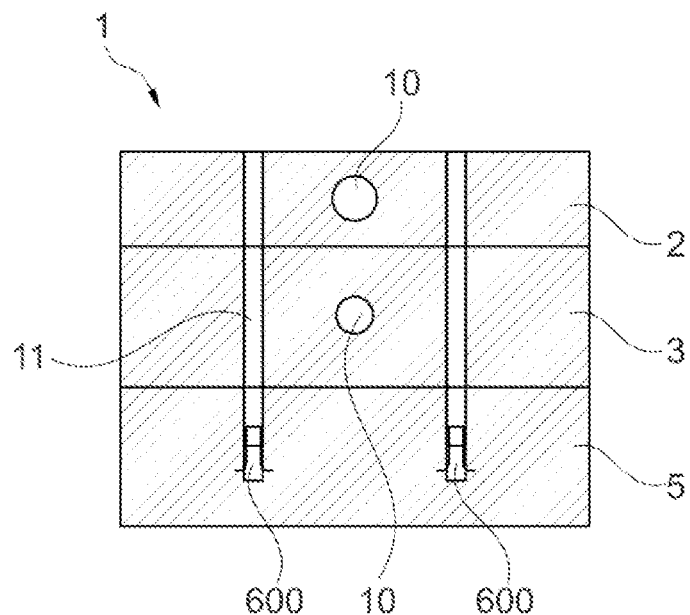
FIG. 13a, FIG. 13b, and FIG. 13c illustrate in schematic and partial lateral section taken along the lines S, T and U in FIG. 11, respectively, some details as to the manner in which the modules of the foundation from FIG. 1 are arranged and fixed together.
Figure 13B:
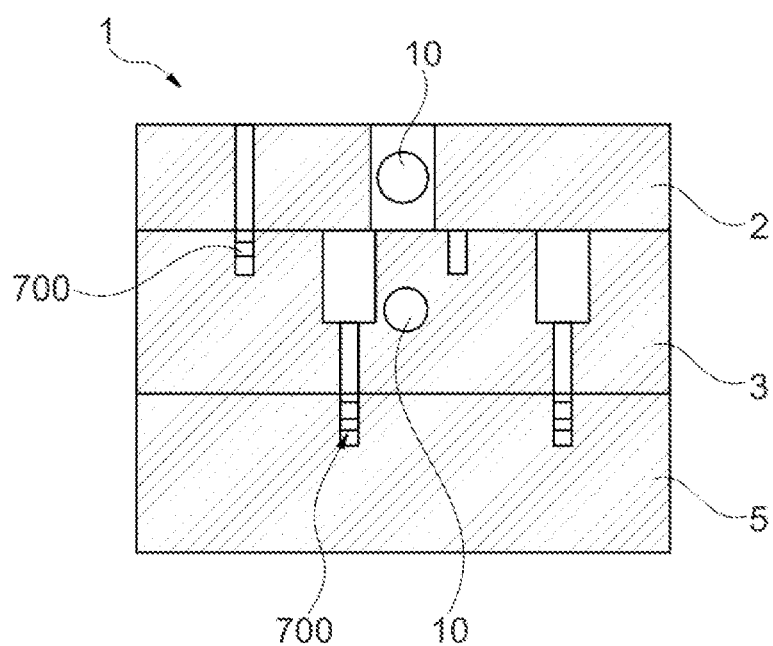

For example anchor bushes 700 are placed in the housings 317 when pouring the concrete, which thereafter enables fixing the modules together, as illustrated in FIG. 12b.

Figure 6B:
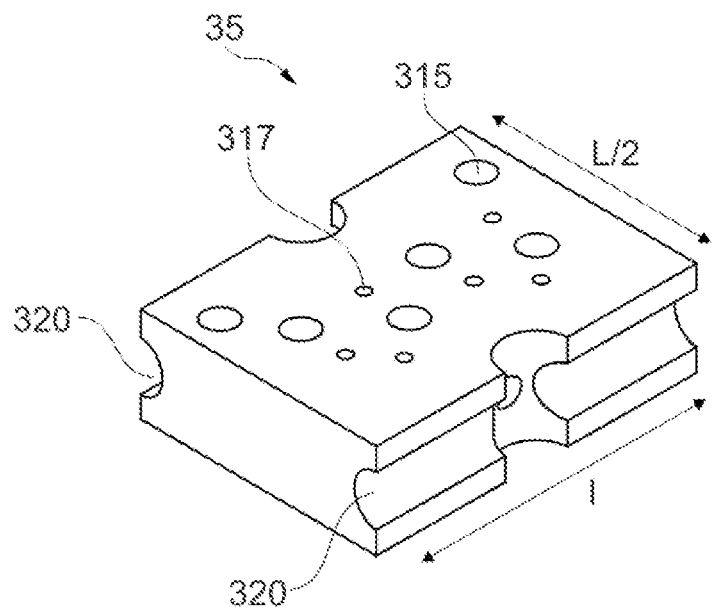

The lower "half-module" 35 illustrated in FIG. 6b is for example identical to half of the module 30 and therefore has the same features as those that have just been described.

Figure 9:
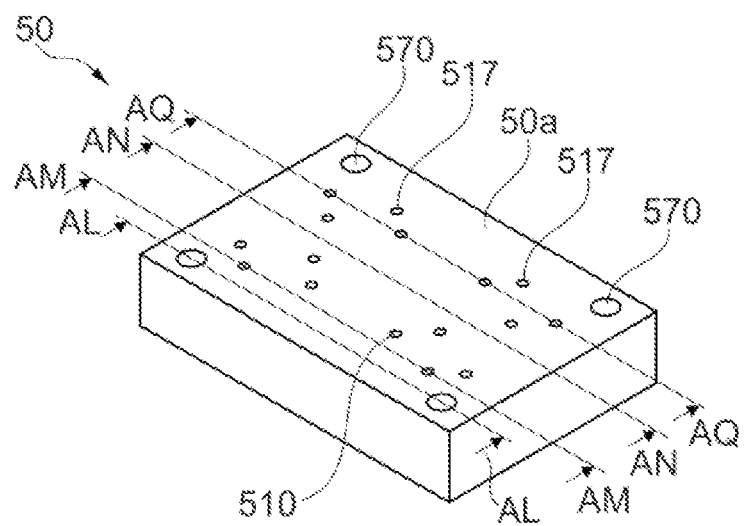

The support slab 50 represented in FIG. 9 may include different types of housings on its upper face 50a, enabling fixing and nesting of the modules of the foundation.

Figure 10B:
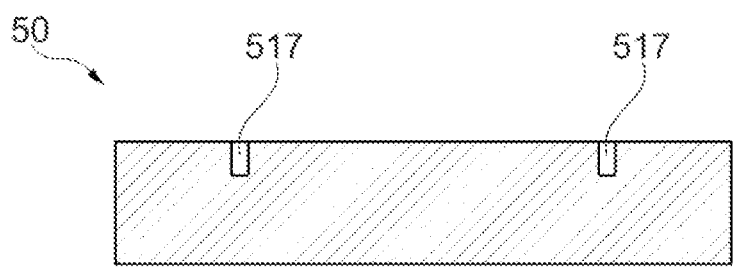
Figure 10C:
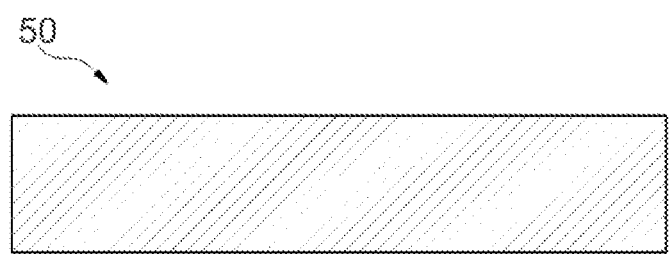

In the example under consideration and as illustrated in FIG. 10c the support slab 50 has no reservations communicating with the internal passage 10.

As described above, the housings 570 disposed at the four corners of the upper face 50a of the module enable reception of the bosses 360 of the lower modules 30 resting on the support layer 5.

As illustrated in FIG. 10b the support slab 50 may include housings 517 that have a shallow depth, for example of the order of 80 mm, adapted to be aligned with the reservations 315 of an underlying upper module 30 and in which anchor bushes 700 are placed for example when pouring the slab.

Figure 10D:
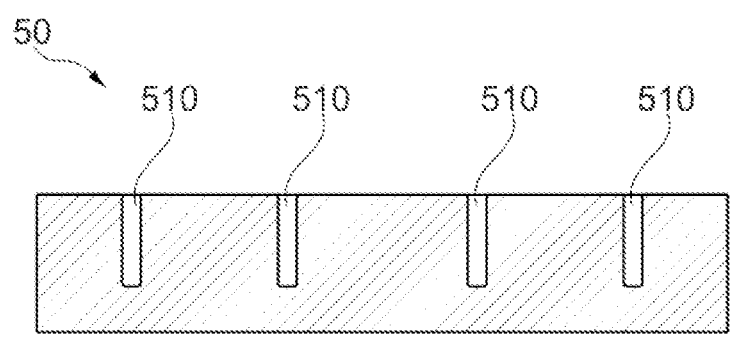

The support slab 50 may further include, as illustrated in FIG. 10d, housings 510, for example 200 mm deep for a slab 300 mm thick, adapted to be aligned with the reservations 310 of the overlying lower modules.

When assembling the modules, vertical reservations 11 are therefore formed from the reservations 210, 310 and the housings 510 through all of the layers 2, 3 and 5 of the foundation 1, as illustrated in FIG. 12a.

When the foundation includes only two layers, the vertical reservations 11 are formed from the reservations 210 and 310, the reservations 310 then taking the form of housings, as illustrated in FIG. 14.

A plate bush 600 may be placed at the bottom of some housings 310 or 510 when pouring the slabs, which, once the modules are assembled, enables a structure to come to be fixed to the foundation for example by inserting assembly tie-rods (not represented) in the reservations 11. When these tie-rods are screwed into the plate bushes 600 the assembly of modules is consolidated through the effect of mutual compression of the modules.

Assembling two adjacent layers by means of the anchor bushes 700 described above is effected directly during placing of the modules. These fixings are preferably disposed in the foundation with an offset, as illustrated in FIG. 12b and in FIG. 13b, which enables the solidity of the assembly to be enhanced.

Figure 12C:
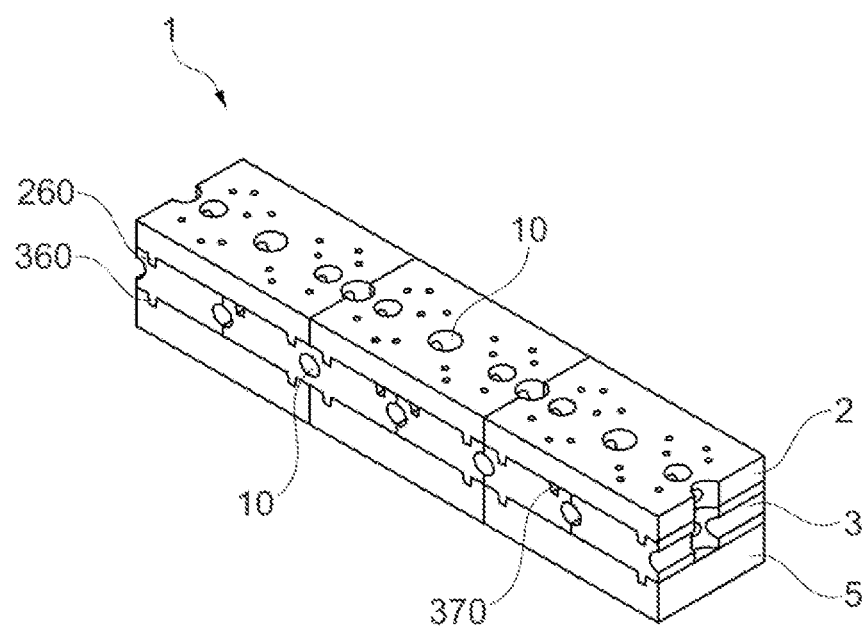
Figure 13C:
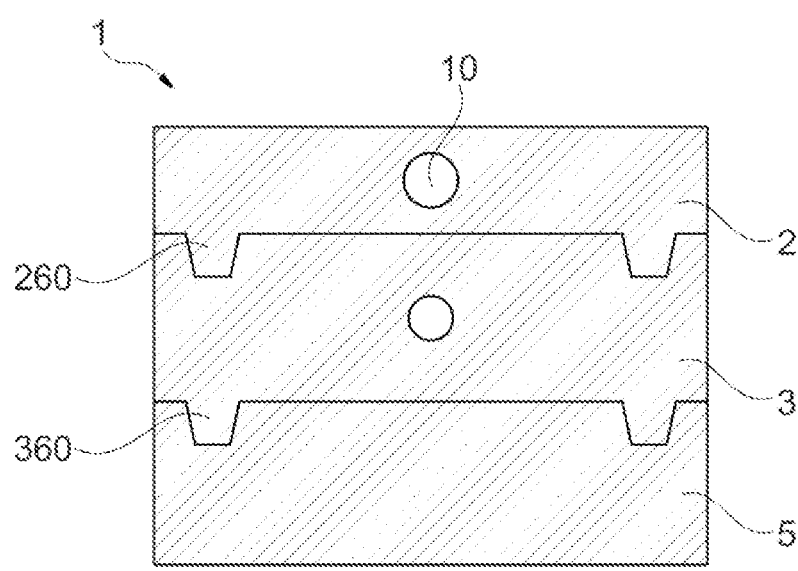

The nesting of the bosses 260 and 360 with the housings 370 and 570 of the various layers of the foundation is illustrated in FIG. 12c and in FIG. 13c fora foundation including an upper layer 2, a lower layer 3 and a support layer 5.

The unoccupied housings 370b enable nesting of two lower layers 3, for example if a 4-layer foundation is required.

To produce a modular foundation 1 according to the invention the first step is for example to excavate a hole to the required depth, for example between 50 and 80 cm, and to level the bottom.

A layer of sand may be placed on the bottom levelled in this way. The support slabs 50 are then placed to form the support layer 5, if the latter is necessary, depending on the structure to be supported.

The prefabricated modules 20 and 30 are then placed in the excavation, fixing the modules to one another by means of the anchor bushes 700 as they are placed.

Once the foundation has been assembled, the supported structure is for example bolted to the foundation by means of the plate bushes present in the support layer 5.

The ducts may be placed in the internal passages formed inside the assembled module.

Of course, the invention is not limited to the examples that have just been described.

There may in particular be lower modules 30 including semi-cylindrical cavities on their upper face 30a in place of some horizontal reservations, as in the assembly illustrated in FIGS. 2b and 2c.

The nesting of the layers relative to one another may be effected by means of reliefs different from the bosses 260 or 360 described above.

The invention claimed is:

1. A modular foundation having a shape of a slab, the modular foundation including:
   a plurality of prefabricated concrete modules defining:
      an upper layer of modules including at least one internal passage opening onto at least its upper and lower faces, a height of the upper layer being less than a width of the upper layer and a length of the upper layer,
      at least one lower layer of modules on which the upper layer at least partially rests, a shape of at least one of the modules of the at least one lower layer being different from a shape of at least one of the modules of the upper layer, including at least one internal passage opening onto at least one of its sides and onto at least its upper face, a height of the at least one lower layer being less than a width of the at least one lower layer and a length of the at least one lower layer,
      the internal passage of said at least one lower layer communicating at a level of an interface between the upper and lower layers with the internal passage of the upper layer in such a manner as to form at least one global internal passage in the modular foundation, said internal passage opening onto at least one side and onto at least an upper face of the modular foundation,
      at least some of the modules including a vertical cavity on at least two opposite sides adapted to form with an opposite vertical cavity of an adjacent module a vertical internal passage of greater section, or the modules of the lower layer or layers including at least one horizontal cavity on at least two opposite sides adapted to form with an opposite horizontal cavity of an adjacent module a horizontal internal passage of greater section.

2. The modular foundation as claimed in claim 1, wherein the plurality of modules form a whole of substantially parallelepipedal general shape.

3. The modular foundation as claimed in claim 1, wherein the modules are assembled to one another laterally.

4. The modular foundation as claimed in claim 1, including a stack of at least three layers of modules.

5. The modular foundation as claimed in claim 1, wherein the modules in a layer are identical at least half by half.

6. The modular foundation as claimed in claim 1, wherein the modules is disposed with an offset from one layer to the next.

7. The modular foundation as claimed in claim 1, wherein at least one layer of modules of the foundation includes at least two modules with different lengths.

8. The modular foundation as claimed in claim 1, wherein the global internal passage in the foundation opens onto at least two sides and onto at least the upper face of the foundation.

9. The modular foundation as claimed in claim 8, wherein the global internal passage has a section that has a diameter (d) at least equal to 80 mm.

10. The modular foundation as claimed in claim 8, wherein the global internal passage includes at least one duct enabling the passage of cables.

11. The modular foundation as claimed in claim 1, including vertical reservations on at least two at least partially stacked modules, the vertical reservations communicating at the level of the interface between the two modules.

12. The modular foundation as claimed in claim 11, wherein the vertical reservations are arranged to receive tie-rods for assembling modules to one another and/or bolts engaging in threaded inserts.

13. The modular foundation as claimed in claim 1, wherein the modules have a thickness between 200 and 300 mm inclusive.

14. The modular foundation as claimed in claim 1, wherein the modules have first reliefs on their lower face, the modules of the lower layer or layers having second reliefs on their upper face, the second reliefs being arranged to be nested at least partially in the first reliefs.

15. The modular foundation as claimed in claim 1, wherein the modules of the upper layer include at least one internal passage opening onto at least one of their upper and lower faces.

16. The modular foundation as claimed in claim 1, wherein the modules of the lower layer or layers include at least one internal passage opening onto at least one of their sides and onto at least their upper face.

17. The modular foundation as claimed in claim 1, further including a support layer including concrete slabs on which all the modules rest.

18. The modular foundation as claimed in claim 17, wherein the concrete slabs have on their upper face housings in which the modules of the layer resting on the support layer can come to be nested.

19. The modular foundation as claimed in claim 17, wherein the reservations communicate with vertical reservations of the concrete slabs at the level of the interface between the support layer and the layer resting on the support layer.

20. The modular foundation as claimed in claim 1, including reservations passing vertically through the upper layer and at least partially through the lower layer or layers.

21. A method installing a modular concrete foundation as claimed in claim 1, the method including:
   producing an excavation,
   producing the foundation by placing prefabricated concrete modules in the excavation.

22. A modular foundation having a shape of a slab, the modular foundation including:
   a plurality of prefabricated concrete modules defining:
      an upper layer of modules including at least one internal passage opening onto at least its upper and lower faces, a height of the upper layer being at least three times less than a width of the upper layer and a length of the upper layer,
      at least one lower layer of modules on which the upper layer at least partially rests, a shape of at least one of the modules of the at least one lower layer being different from a shape of at least one of the modules of the upper layer, including at least one internal passage opening onto at least one of its sides and onto at least its upper face, a height of the at least one lower layer being at least three times less than a width of the at least one lower layer and a length of the at least one lower layer, the internal passage of said at least one lower layer communicating at a level of an interface between the upper and lower layers with the internal passage of the upper layer in such a manner as to form at least one global internal passage in the modular foundation, said internal passage opening onto at least one side and onto at least an upper face of the modular foundation.

23. A modular foundation having a shape of a slab, the modular foundation including:
- a plurality of prefabricated concrete modules defining:
  - an upper layer of modules including at least one internal passage opening onto at least its upper and lower faces, a height of the upper layer being less than a width of the upper layer and a length of the upper layer,
  - at least one lower layer of modules on which the upper layer at least partially rests, a shape of at least one of the modules of the at least one lower layer being different from a shape of at least one of the modules of the upper layer, including at least one internal passage opening onto at least one of its sides and onto at least its upper face, a height of the at least one lower layer being less than a width of the at least one lower layer and a length of the at least one lower layer, the internal passage of said at least one lower layer communicating at a level of an interface between the upper and lower layers with the internal passage of the upper layer in such a manner as to form at least one global internal passage in the modular foundation, said internal passage opening onto at least one side and onto at least an upper face of the modular foundation,
- each of the at least one lower layer of modules and the upper layer modules only including one or more identical modules, and semi-modules corresponding to half of a said identical module.

* * * * *